United States Patent Office 3,096,850
Patented July 9, 1963

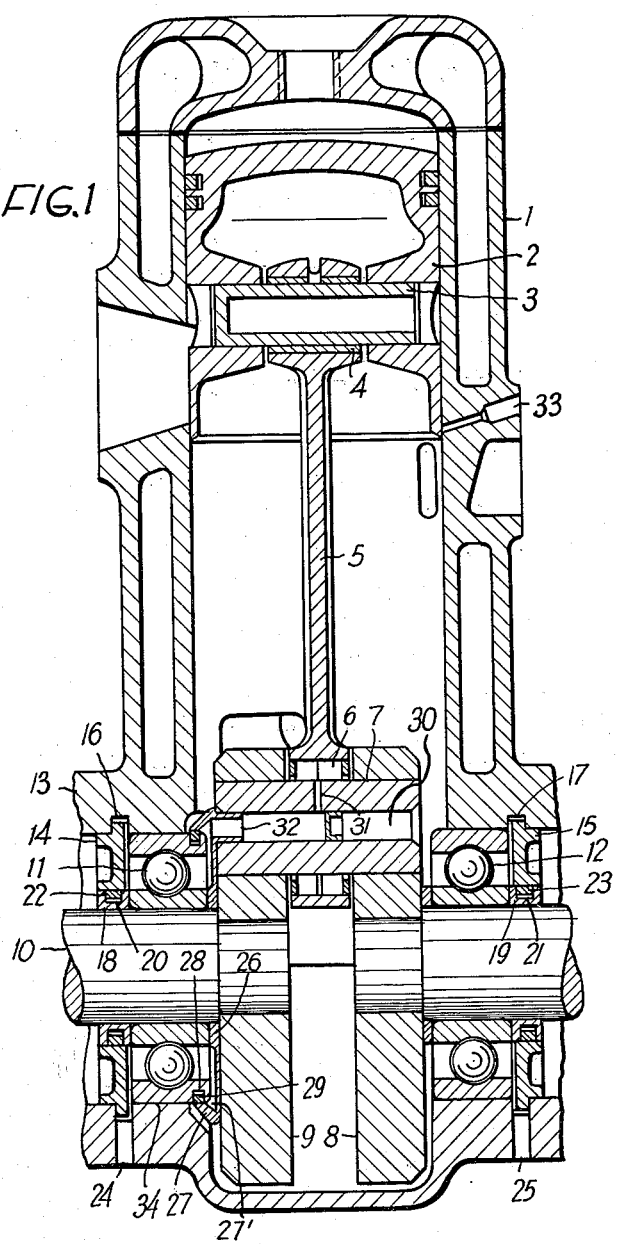

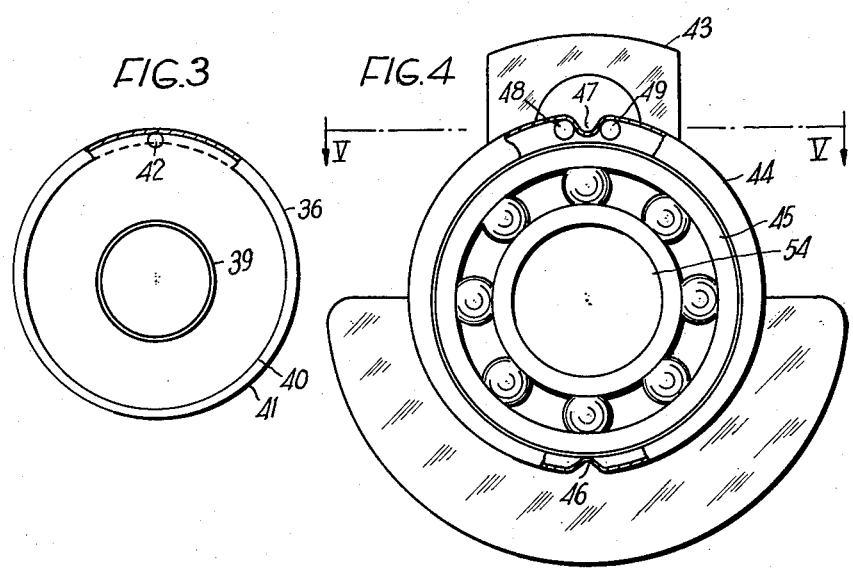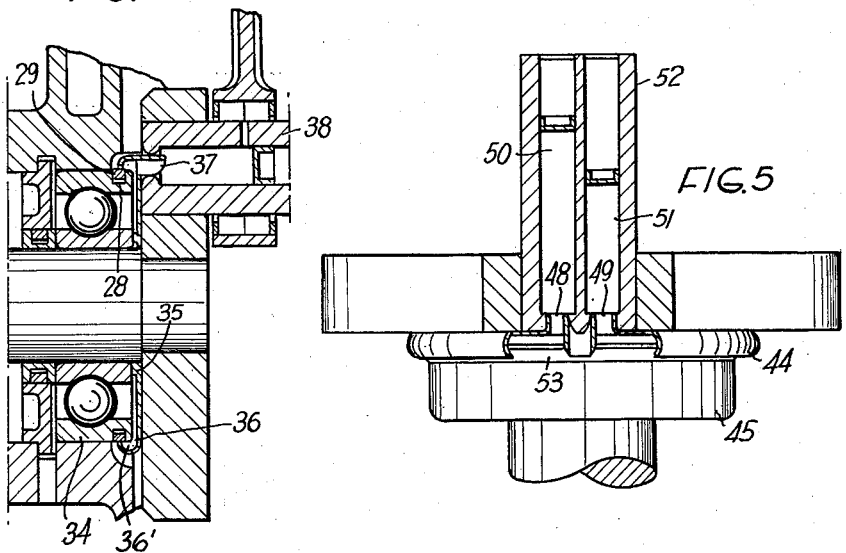

3,096,850
DEVICE FOR LUBRICATING CRANKSHAFT AND CONNECTING ROD BEARINGS BY MEANS OF A FORCED-FEED LUBRICATOR
Nils Kaj Gunnar Rosenqvist, Trollhattan, Sweden, assignor to Svenska Aeroplan Aktiebolaget, Trollhattan, Sweden, a corporation of Sweden
Filed Feb. 15, 1961, Ser. No. 89,470
Claims priority, application Sweden Feb. 15, 1960
2 Claims. (Cl. 184—6)

This invention relates to a device for lubricating the bearings of a crankshaft and a connecting rod mounted thereon by means of a forced-feed lubricator, wherein the crankshaft is mounted in anti-friction bearings. The invention may be applied, for instance, to a two-stroke cycle engine the crankshaft of which is provided with anti-friction bearings and the crankcase of which is used as a scavenging pump for the fuel-air mixture. Hitherto it has been common practice to lubricate the bearings in such a two-stroke cycle engine by adding the lubricant to the fuel in a certain proportion. During the passage of the fuel through the crankcase the oil is separated and finds an opportunity of lubricating the bearings located in the crankcase. Also the cylinder is lubricated in this manner by lubricant which is separated from the fuel in the part of the cylinder located above the piston. However, this method of lubricating a two-stroke cycle engine suffers from considerable inconveniences. Large amounts of lubricant are carried along with the exhaust gases which consequently become smoky and evil-smelling. Further, lubricant is deposited on the spark plugs where it may prevent their proper function, as well as in the cylinders where it is coked and causes the piston rings to get stuck. There is also the risk of certain bearings receiving too small amount of lubricant with the possible result of seizure. Finally, the addition of lubricant to the fuel involves a considerable waste, since the lubricant must be added in quantities exceeding the actually required quantities, in order to ensure sufficient lubrication in all circumstances.

The object of the invention is to render possible the supply of lubricant in predetermined properly related amounts. In the device to which the invention relates lubricant is passed through anti-friction bearings disposed on either side of a crankshaft throw, which anti-friction bearings are provided with sealing means on their sides remote from the crankshaft throw, and on one side of the throw there is provided an annular pocket rotating along with the throw and having an edge directed radially inwards toward the axis of the crankshaft, said pocket being adapted to collect lubricant from the adjacent anti-friction bearing and forward the lubricant through an opening in the pocket to the connecting rod bearing. In its broadest aspect, the invention is characterized by a radially expanding sealing ring which bears on the inwardly directed edge of the pocket and rotates along with the pocket, said sealing ring being partly inserted in a groove in the outer race of the anti-friction bearing.

Several suitable embodiments of the invention as applied to a two-stroke cycle engine are described hereinbelow with reference to the annexed drawing in which FIG. 1 is a vertical sectional view of a cylinder and the appertaining crankcase portion, FIG. 2 a sectional view of a simplified embodiment of an oil pocket, FIG. 3 a partly sectional view of the oil pocket as viewed from the left of FIG. 1, FIG. 4 an axial view of a special construction of the collecting pocket, and FIG. 5 a sectional view taken along the line V—V in FIG. 4.

The engine comprises a water-cooled cylinder 1 for a piston 2 with a piston pin 3. Mounted on said pin by means of a journal bearing 4 is one end of a connecting rod 5 the other end of which is mounted on a crank pin 7 by means of a roller bearing 6. The crank pin is fastened in two crank webs 8, 9 disposed on either side of the roller bearing and forming part of the crankshaft 10 of the engine. By means of ball bearings 11, 12 provided on either side of the crank webs the crankshaft is mounted in the suitably divided crankcase 13.

On its side remote from the crank webs 8, 9 each of the ball bearings 11, 12 is sealed by means of a radial ring 14 and 15, respectively, which is stationary and is secured in an annular groove 16 and 17, respectively, in the crankcase 13 and provides for a radial clearance with respect to the crankshaft 10. In each of these clearances there is provided a ring 18 and 19, respectively, which is secured to the crankshaft and has a circular groove 20 and 21, respectively, in the periphery which faces the ring 14 and 15, respectively. Inserted into said groove is a radially expanding sealing ring 22, 23, respectively, which bears on the radially inner side of the rings 14 and 15, respectively. Each of the grooves 16, 17 for the rings 14, 15 communicates with a duct 24 and 25, respectively, in the crankcase. By means of a conduit, not shown, these ducts communicate with a forced-feed lubricator for the supply of lubricant to the bearings of the engine. Clearances are provided between the rings 14, 15 and the ball bearings 11, 12 to form supply ducts in communication with the spaces between the outer and inner races of the ball bearings. The ball bearing 11 located to the left of the crank webs as viewed in the drawing has a sealing ring 26 on the side which faces the crank webs. This sealing ring is mounted on the crankshaft 10 between the inner race of the ball bearing and the adjacent crank web 9. The ring 26 extends radially along the crank web 9 at a small axial distance from the outer race 34 of the ball bearing and finishes off slightly radially outwardly of the outer race with a flange 27 which extends obliquely inwardly toward the axis of the crankshaft. The flange 27 terminates at a small distance from the periphery of the outer race and forms one wall of a circular pocket 27' which is triangular in cross-section. Near the location of the free edge of the flange 27 the outer race 34 of the ball bearing has an annular groove 28 in which there is inserted a radially expanding sealing ring 29 which sealingly bears on the free edge of the flange 27 and rotates along with the flange. The ring 26 extends radially outward beyond an axial bore 30 in the crank pin 7, which bore is open toward the ring 26 and is closed at the other end. The crank pin 7 also has a radial duct 31 which connects the axial bore 30 with the connecting rod bearing 6. At the collecting pocket 27' the ring 26 has a discharge hole 42 (see FIG. 3) to which there is connected a short tube 32 which snugly fits the axial bore 30 of the crank pin. As shown in the drawing, the cylinder wall has an oil hole 33 which opens into the cylinder 1 at a location which the lower edge of the piston 2 assumes when the piston is in its upper dead center position. The oil hole 33 also communicates with the forced-feed lubricator.

The shape of the triangular pocket 27' is such that the distance between the axis of the crankshaft 10 and the bottom of the pocket is a maximum at the discharge hole 42 and a minimum at a point diametrically opposite the hole 42, the object thereof being to have the oil during operation immediately flow out into the bore of the crank pin 7 and to prevent accumultaion of oil which when the engine is at a rest is likely to drain down into the crankcase and at the start of the engine results in the generation of smoke and unnecessary volumes which delay the transport of the oil to the bearings.

FIG. 3 is a lateral view of the pocket. 27' The holes 39 and 40 are concentric, whereas the periphery 41 of the oil pocket is eccentric with respect to the guide hole 39 which is concentric with respect to the axis of the crankshaft. The oil discharge takes place through the hole 42 the outer edge of which is tangential to the periphery 41 of the oil pocket at the place remotest from the axis of the guide hole 39.

FIG. 2 illustrates a simplified construction without sealing in a proper sense between a spout 37 and the crank pin 38. The axial bore in the crank pin 38 has a reduced portion which prevents oil from leaking into the crankcase other than through the connecting rod bearing. The spout portion 37 of the ring 36 which advantageously is pressed from sheet metal is sufficiently long to engage the reduced portion of the crank pin 38. The sealing ring 29 is guided in the opening 40, FIG. 3, which is coaxial with respect to the guide hole 39. The spout 37 is formed on that part of the periphery 41 which is remotest from the axis of the openings 39 and 40 and provided with the discharge hole 42.

The device according to the invention operates in the following manner. In operation of the engine lubricant is supplied by the lubricator to the ducts 24, 25 in the crankcase and passes into the ball bearings 11, 12 to lubricate the same. From the left ball bearing 11 the lubricant passes under the action of the centrifugal force along the inner ring 26 or along the outer race 34 of the ball bearing and is collected in the annular pocket. Therefrom, the lubricant finds its way through the axial bore 30 in the crank pin 7 to the connecting rod bearing 6 and lubricates this bearing. Since there is no sealing ring provided at the other ball bearing 12, the lubricant from this bearing enters the crankcase so that an adequate amount of lubricant will be supplied to the bearing at the upper end of the connecting rod. Finally, the cylinder bore can be effectively lubricated through the oil hole 33 in the cylinder.

The embodiment of the invention illustrated in FIGS. 4 and 5 is suited for the supply of oil to two or more connecting rods mounted on a common throw, the oil being supplied through a main bearing 45 and divided into two equal parts as a result of a special construction of a collecting pocket 44 located eccentrically with respect to the axis of the crankshaft.

At its deepest, uppermost portion the pocket is narrowed by the depressed projection 47. A similar projection 46 is provided at the diametrically opposite, shallowest side of the pocket. Discharge holes 48 and 49 are located on either side of the projection 47.

In operation, oil flowing out over the outer race 45 of the bearing is collected in the oil pocket 44 which is secured eccentrically with respect to the crankshaft 54 A ring 53 prevents oil from leaking out. By means of the projection 46 the oil is divided into two equal parts which flow toward the discharge holes 48 and 49. The projection 47 prevents the streams of oil from mixing with each other. The oil flows through the discharge holes 48 and 49 and is collected in bores 50 and 51 in the crank pin 52. The bores are closed at one end and supply oil through two bores, not shown, to the two bearings on the crank pin 52.

The use of the invention is not limited to a combustion engine, and the invention may be applied with equal advantage to other contrivances comprising a piston connected with a crankshaft, such as a reciprocating compressor.

What is claimed is:

1. In a lubricating system for reciprocating machines, the combination comprising a frame having a piston cylinder, a pair of bearing seats formed in the frame, a crankshaft having a hollow crankpin and two main bearing seats, a pair of main antifriction crankshaft bearings having outer races located in said frame bearing seats and inner races mounted on said crankshafts seats, ducts in said frame communicating with said bearing seats to supply lubricant to said crankshaft bearings, an antifriction bearing mounted on the crankpin, a piston located in the cylinder, a connecting rod having a portion surrounding the crankpin bearing, sealing means on the sides of said crankshaft bearings remote from the crank of said crankshaft, a lubricant collecting ring on one side of said crank having a perpheral edge directed radially inwards toward the axis of said crankshaft and a spout opening into said hollow crankpin whereby lubricant from the corresponding crankshaft bearing is transmitted to said crankpin antifriction bearing, a peripheral groove in the outer race of the crankshaft bearing near said collecting ring, an outwardly radially expanding sealing ring disposed in said groove, said sealing ring bearing on said inwardly directed peripheral edge of said lubricant collecting ring.

2. In a lubricating system according to claim 1, wherein said lubricant collecting ring is divided along a vertical diameter into two separate portions, each portion opening in said hollow crankpin.

References Cited in the file of this patent
UNITED STATES PATENTS 2,056,901    Kylen _____ Oct. 6, 1936

FOREIGN PATENTS 726,453    Germany _____ Oct. 14, 1942